Nov. 3, 1942.  J. R. FIDLER  2,300,446
ROLLING COLTER
Filed Nov. 18, 1940
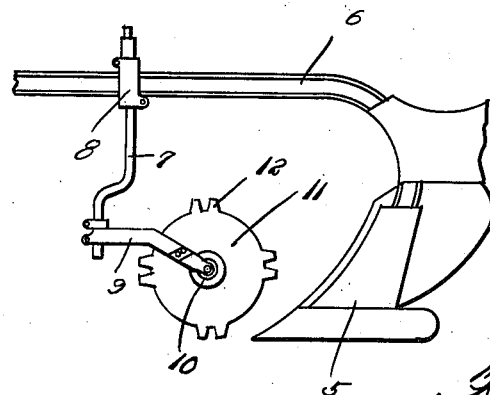
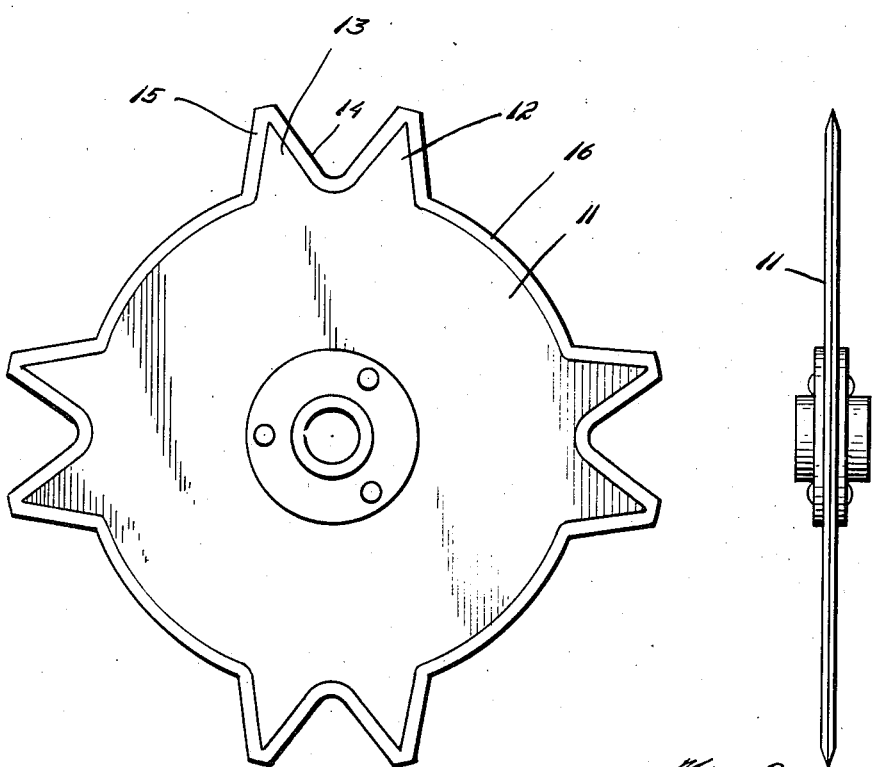
Fig. 1.
Fig. 2.  Fig. 3.
Inventor
James R. Fidler
By  Clarence A. O'Brien
Attorney

UNITED STATES PATENT OFFICE 2,300,446

ROLLING COLTER

James R. Fidler, Clifton Hill, Mo.

Application November 18, 1940, Serial No. 366,179

3 Claims. (Cl. 97—209)

The present invention relates to new and useful improvements in attachments for plows and has for its primary object to provide a rolling colter or cutter adapted to fasten to the beam of the plow when used in plowing a stubble field where the grain has been combined and straw left in windrows.

An important object of the present invention is to provide a rolling or rotating colter of this character embodying a plurality of tuckers projecting radially from the peripheral edge of the colter whereby to more efficiently cut the straw and tuck the same into the ground for covering by the plow.

A further object is to provide an attachment of this character of simple and practical construction, which is efficient and reliable in performance, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1 is a fragmentary side elevational view of a plow showing the improved colter mounted in position thereon, Figure 2 is a side elevational view of the colter blade, and Figure 3 is an edge elevational view thereof.

Referring now to the drawing in detail, the numeral 5 designates a plow above which the beam 6 is positioned and from which is supported the hanger 7 by means of a clamp 8. On the lower end of the hanger 7 is a rearwardly extending arm 9 having a hub 10 at its rear end on which the colter 11 is rotatably supported in an upright position as shown to advantage in Figure 1 of the drawing. The colter 11 is of generally disk form and projecting radially from the peripheral edge thereof is a plurality of tuckers designated generally at 12, the tuckers comprising a pair of teeth 13 cooperating to form a substantially V-shaped notch 14 between each pair of teeth. The tuckers 12 are disposed at diametrically opposite sides of the colter and the edges of the teeth, on both their inside and outside edges are bevelled as shown at 15 to provide a cutting edge for the teeth and the edge portion of the colter between each of the tuckers is also bevelled to provide a cutting edge 16.

In the operation of the device, as the colter travels along the ground in advance of the plow 5 the V-shaped notches 14 between the teeth 13 will cooperate to engage the loose straw as the same is cut by the colter for tucking the same into the ground in a manner to more effectively permit the straw to be covered by the plow.

It is believed the details of construction, manner of use and advantages of the device will be readily understood from the foregoing without further detailed explanation.

Having thus described the invention, what I claim is:

1. A rotating colter attachment for plows comprising an annular member and a plurality of tuckers projecting radially from the member, each of said tuckers being arranged in pairs and adapted for receiving loose straw therebetween for tucking the same into the ground in advance of the plow.

2. A rolling colter attachment for plows comprising a disk, means for rotatably supporting the disk in advance of the plow and a plurality of teeth projecting radially from the perimeter of the disk, said teeth being arranged in pairs and cooperating to form a V-shaped notch between each pair of teeth adapted to engage loose straw for tucking the same into the ground in advance of the plow.

3. A rolling colter attachment for plows comprising a disk, means for rotatably supporting the disk in advance of the plow and a plurality of teeth projecting radially from the perimeter of the disk, said teeth being arranged in pairs and cooperating to form a V-shaped notch between each pair of teeth adapted to engage loose straw for tucking the same into the ground in advance of the plow, the peripheral edge of the disk and each edge of the teeth being bevelled to provide cutting edges therefor.

JAMES R. FIDLER.